(12) United States Patent
Mecklem et al.

(10) Patent No.: US 10,867,519 B2
(45) Date of Patent: Dec. 15, 2020

(54) AIRCRAFT FLIGHT INFORMATION SYSTEM AND METHOD

(71) Applicant: THE BOEING COMPANY, Chicago, IL (US)

(72) Inventors: Sarah A. Mecklem, Brisbane (AU); Reece A. Clothier, Melbourne (AU); Brendan P. Williams, Brisbane (AU); Neale L. Fulton, Canberra (AU); Grace S. Garden, Brisbane (AU)

(73) Assignee: THE BOEING COMPANY, Chicago, IL (US)

( * ) Notice: Subject to any disclaimer, the term of this patent is extended or adjusted under 35 U.S.C. 154(b) by 141 days.

(21) Appl. No.: 15/994,454

(22) Filed: May 31, 2018

(65) Prior Publication Data

US 2019/0371183 A1    Dec. 5, 2019

(51) Int. Cl.
*G08G 5/00* (2006.01)
*G08G 5/04* (2006.01)

(52) U.S. Cl.
CPC ......... *G08G 5/0021* (2013.01); *G08G 5/0078* (2013.01); *G08G 5/04* (2013.01)

(58) Field of Classification Search
CPC ....... G08G 5/0021; G08G 5/0078; G08G 5/04
USPC ........................................................ 701/120
See application file for complete search history.

(56) References Cited

U.S. PATENT DOCUMENTS 5,732,697 A     3/1998 Zhang et al.
7,706,979 B1 *  4/2010 Herwitz ................ G01S 13/003
                                                701/301
10,139,474 B2 * 11/2018 Gurusamy ................ G01S 7/24
2002/0133294 A1    9/2002 Farmakis et al.
2007/0222665 A1 *  9/2007 Koeneman ........... G08G 5/0008
                                                342/29
2009/0259402 A1 * 10/2009 Gates ....................... G08G 3/02
                                                701/301

(Continued)

FOREIGN PATENT DOCUMENTS

EP    2196974 A1    6/2010
EP    3089115 A1    11/2016
GB    2492665 A     1/2013

OTHER PUBLICATIONS

Darrah, Sara, "Air Force's C-ABSAA Program, Automation Lessons Learned," U.S. Air Force, Sep. 20, 2017, 37 pgs.

(Continued)

*Primary Examiner* — Yazan A Soofi
(74) *Attorney, Agent, or Firm* — Moore IP Law

(57) ABSTRACT

A method of generating an aircraft display includes determining an estimated first flight path of a first aircraft and determining an estimated second flight path of a second aircraft. The method also includes determining an estimated proximity of the first aircraft and the second aircraft based on the estimated flight paths. The method further includes, based on the estimated proximity indicating a projected separation violation condition, determining a navigation alert region. The method also includes generating a display that includes a map, a first graphical feature overlaying the map and representing of the first aircraft, a second graphical feature overlaying the map and representing of the second aircraft, and a third graphical feature overlaying the map and indicating dimensions of the navigation alert region.

20 Claims, 9 Drawing Sheets

(56) References Cited

U.S. PATENT DOCUMENTS

| | | | |
|---|---|---|---|
| 2012/0150367 A1 | 6/2012 | Potagnik et al. | |
| 2012/0303252 A1 | 11/2012 | Schwinn et al. | |
| 2013/0179009 A1* | 7/2013 | Gershzohn | G05D 1/101 |
| | | | 701/3 |
| 2014/0257602 A1 | 9/2014 | Gaston | |
| 2015/0154874 A1* | 6/2015 | Murthy | G08G 5/06 |
| | | | 701/120 |
| 2015/0364044 A1* | 12/2015 | Kashi | G08G 5/0095 |
| | | | 701/120 |
| 2016/0071422 A1* | 3/2016 | Bazawada | G08G 5/0021 |
| | | | 701/439 |
| 2018/0090018 A1* | 3/2018 | Gavrilets | G06T 7/246 |
| 2019/0304314 A1* | 10/2019 | Hochwarth | G08G 5/0008 |
| 2019/0371183 A1 | 12/2019 | Mecklem et al. | |
| 2020/0111375 A1 | 4/2020 | Garden et al. | |
| 2020/0202732 A1 | 6/2020 | Mecklem et al. | |

OTHER PUBLICATIONS

RTCA, Inc., Minimum Operational Performance Standards (MOPS) for Detect and Avoid (DAA) Systems, RTCA Paper No. 261-15/PMC-1400, Dec. 9, 2016, 775 pgs.

Shively, J., "NASA UAS Integration Into the NAS Project Detect and Avoid Display Evaluations," Air Force—NASA Bi-Annual Research Council Meeting, Oct. 12, 2016, <https://ntrs.nasa.gov/search.jsp?R=20160013551 2018-05-31IT16:05:50+00:00Z,>10 pgs.

Extended European Search Report for Application No. 19183220.3 dated Mar. 5, 2020, 6 pgs.

Edwards, Gerald D., et al., "Visual Aspects of Air Collision Avoidance: Computer Studies on Pilot Warning Specifications—Final Report," NASA-Ames Research Center, Grant No. NG-05-009-059, pp. 1-29.

Extended European Search Report for Application No. 19191085.0, dated Dec. 19, 2019, 7 pgs.

Fulton, N. L., and Huynh, U. 2015. Conflict Management: Apollonius in Airspace Design, Safety Science, vol. 72, pp. 9-22, Feb. 2015.

Fulton, Neale L. et al., "Aircraft Proximiy: a synthesis of Appollonius, X-track, and Well Clear Vollume pardigms," 2018 IEEE/AIAA 37th Digital Avionics Systems Conference (DASC), London, 2018, pp. 1-10, doi: 10.1109/ DASC.2018.8569870.

Fulton, Neale L. et al., "The Apollonian paradigm in Cockpit and Ground-based Pilot Display Design," 2019 IEEE/AIAA 38th Digital Avionics Systems Conference (DASC), San Diego, CA, USA, 2019, pp. 1-10, doi: 10.1109/ DASC43569.2019.9081694.

Garden, Grace et al. "A Novel Approach to the Generation of Aircraft Collision Avoidance Advisories," 2019 IEEE/AIAA 38th Digital Avionics Systems Conference Sep. 2019, DOI: 10.1109/DASC43569.2019.9081694, pp. 1-12.

INEXA Control, Par of INEXA solutions, https://www.insitu.com/inexa-control, retrieved Sep. 2, 2020, 4 pgs.

Munoz, C. et al. "Daidalus: Detect and Avoid Alerting Logic for Unmanned Systems," in Proc. 34th Digital Systems Conference, Prague, Czech Republic, Sep. 13-17, 2015, pp. 1-18.

Munoz, Cesar A., et al., "A Family of Well-Clear Boundary Models for the Integration of UAS with the NAS," AIAA Aviation Forum, Jun. 16-20, 2014, Atlanta Georgia, 14th AIAA Aviation Technology, Integration, and Operations Conference, American Institute of Aeronautics and Astronautics, DOI: 10.2514/6.2014-2412, pp. 1-16.

Randle, Jr., Robert J., "Visual Field Narrowing by Non Visual Factors," Flying Safety, Jul. 1982, pp. 14-18.

U.S. Department of Transportation, Federal Aviation Administration, "Introduction to TCAS II, Version 7.1," Feb. 28, 2011, pp. 1-50.

Wadley, Jason E. et al., "Development of an Automatic Aircraft Collision Avoidance System for Fighter Aircraft," Guidance, Navigation, and Control and Co-located Conferences, Aug. 19-22, 2013, Boston MA, American Institute of Aeronautics and Astronautics, pp. 1-12.

* cited by examiner

AIRCRAFT FLIGHT INFORMATION SYSTEM AND METHOD

FIELD OF THE DISCLOSURE

The present disclosure is generally related to an aircraft flight information system.

BACKGROUND

For automatically piloted aircraft, Detect and Avoid (DAA) systems use information descriptive of an airspace to make automated maneuvering decisions. For manned aircraft, DAA systems can greatly improve pilot situational awareness by providing the pilot with relevant data about the airspace. DAA systems can be used in conventional manned aircraft and for unmanned, remotely piloted aircraft, since in both situations the pilot can have limited access to the relevant airspace information.

To improve DAA system operation and design, the Radio Technical Commission for Aeronautics (RTCA) has published a document entitled "SC228 Ph 1 Minimum Operational Performance Standard (MOPS)," which suggests minimum features of a DAA system, including some features of displays (or other human machine interfaces) used by DAA systems. Generally, the SC228 Ph 1 MOPS document addresses issues related to unmanned aircraft operating at high altitudes, rather than low-altitude airspace operations for manned or unmanned aircraft. Additionally, the SC228 Ph 1 MOPS document does not describe how to gather and analyze airspace data to generate a display including pilot-relevant information, and does not provide guidance on arranging such displays to reduce pilot workload. The SC228 Ph 1 MOPS document also does not describe the use of DAA systems in a cockpit to support conventionally-piloted aircraft operations.

SUMMARY

In a particular implementation, a method of generating an aircraft display includes determining an estimated first flight path of a first aircraft and determining an estimated second flight path of a second aircraft. The method also includes determining an estimated proximity of the first aircraft and the second aircraft based on the estimated first flight path and the estimated second flight path. The method further includes, based on the estimated proximity indicating a projected separation violation condition, determining a navigation alert region, where the projected separation violation condition is expected to occur if the first aircraft flies into the navigation alert region. The method also includes generating a display. The display includes a map representing a geographic area near the first aircraft and the second aircraft, a first graphical feature overlaying the map and representing of the first aircraft, a second graphical feature overlaying the map and representing of the second aircraft, and a third graphical feature overlaying the map and indicating dimensions of the navigation alert region relative to the geographic area near the first aircraft and the second aircraft.

In a particular implementation, an aircraft flight information system includes at least one processor and a memory storing instructions that are executable by the at least one processor to perform operations. The operations include determining an estimated first flight path of a first aircraft and determining an estimated second flight path of a second aircraft. The operations also include determining an estimated proximity of the first aircraft and the second aircraft based on the estimated first flight path and the estimated second flight path. The operations further include, based on the estimated proximity indicating a projected separation violation condition, determining a navigation alert region, where the projected separation violation condition is expected to occur if the first aircraft flies into the navigation alert region. The operations also include generating a display. The display includes a map representing a geographic area near the first aircraft and the second aircraft, a first graphical feature overlaying the map and representing of the first aircraft, a second graphical feature overlaying the map and representing of the second aircraft, and a third graphical feature overlaying the map and indicating dimensions of the navigation alert region relative to the geographic area near the first aircraft and the second aircraft.

In a particular implementation, a non-transitory computer readable storage device stores instructions that are executable by a processor to perform operations. The operations include determining an estimated first flight path of a first aircraft and determining an estimated second flight path of a second aircraft. The operations also include determining an estimated proximity of the first aircraft and the second aircraft based on the estimated first flight path and the estimated second flight path. The operations further include, based on the estimated proximity indicating a projected separation violation condition, determining a navigation alert region, where the projected separation violation condition is expected to occur if the first aircraft flies into the navigation alert region. The operations also include generating a display. The display includes a map representing a geographic area near the first aircraft and the second aircraft, a first graphical feature overlaying the map and representing of the first aircraft, a second graphical feature overlaying the map and representing of the second aircraft, and a third graphical feature overlaying the map and indicating dimensions of the navigation alert region relative to the geographic area near the first aircraft and the second aircraft.

DETAILED DESCRIPTION

Figure 1:
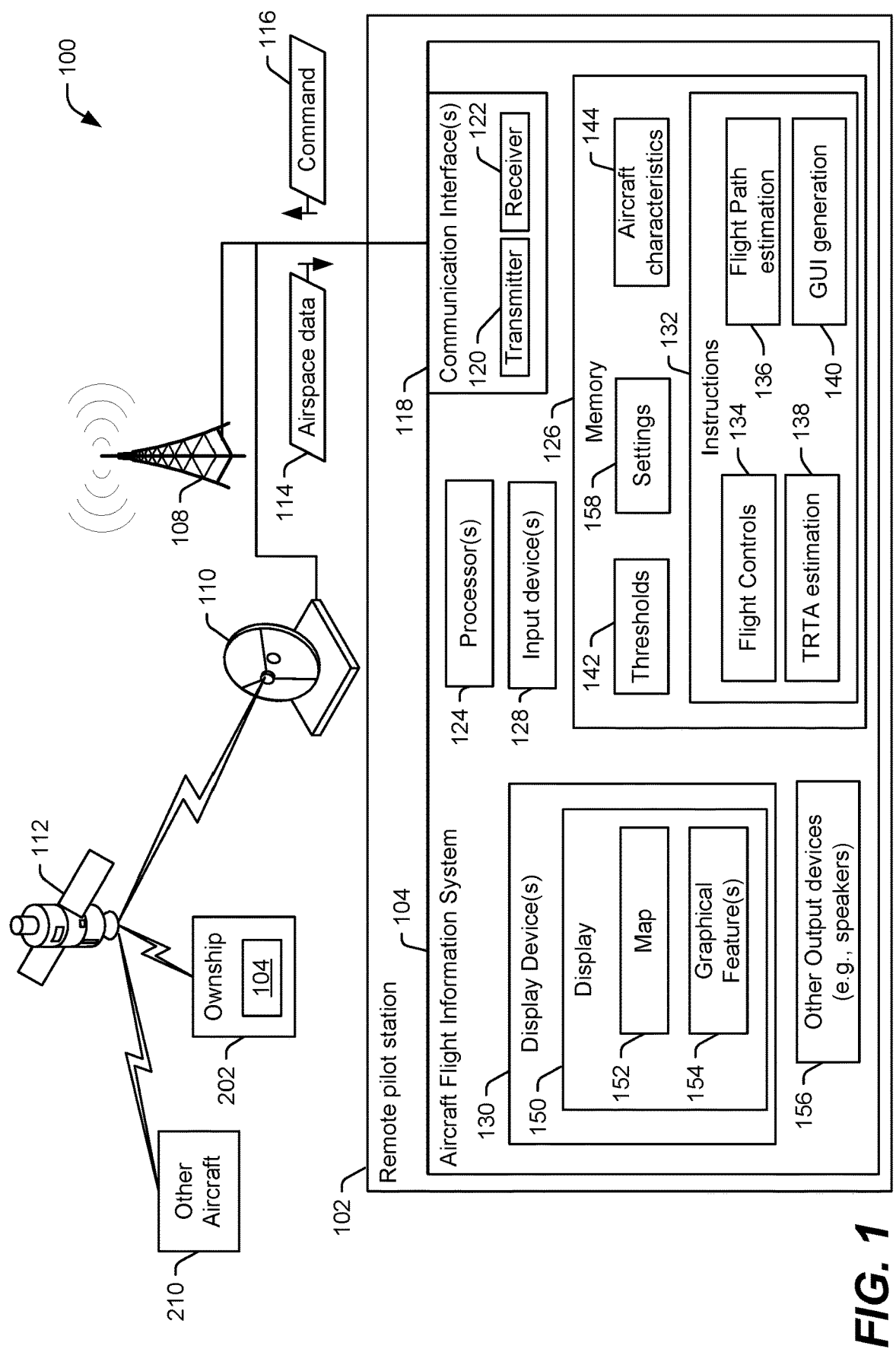
FIG. 1 is a block diagram that illustrates an example of a system that includes an aircraft flight information system.

Implementations disclosed herein provide human machine interfaces that improve pilot situational awareness and reduce pilot workload by organizing data presented to the pilot in a manner that prioritizes the data and simplifies understanding of the data. Particular implementations are described herein with reference to the drawings. In the description, common features are designated by common reference numbers throughout the drawings. In some drawings, multiple instances of a particular type of feature are used. Although these features are physically and/or logically distinct, the same reference number is used for each, and the different instances are distinguished by addition of a letter to the reference number. When the features as a group or a type are referred to herein (e.g., when no particular one of the features is being referenced), the reference number is used without a distinguishing letter. However, when one particular feature of multiple features of the same type is referred to herein, the reference number is used with the distinguishing letter. For example, referring to FIG. 2, multiple aircraft are illustrated and associated with reference numbers 210A, 210B, and 210C. When referring to a particular one of these aircraft, such as the aircraft 210A, the distinguishing letter "A" is used. However, when referring to any arbitrary one of these aircraft or to these aircraft as a group, the reference number 210 is used without a distinguishing letter.

As used herein, various terminology is used for the purpose of describing particular implementations only and is not intended to be limiting. For example, the singular forms "a," "an," and "the" are intended to include the plural forms as well, unless the context clearly indicates otherwise. Further, the terms "comprise," "comprises," and "comprising" are used interchangeably with "include," "includes," or "including." Additionally, the term "wherein" is used interchangeably with the term "where." As used herein, "exemplary" indicates an example, an implementation, and/or an aspect, and should not be construed as limiting or as indicating a preference or a preferred implementation. As used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). As used herein, the term "set" refers to a grouping of one or more elements, and the term "plurality" refers to multiple elements.

As used herein, "generating", "calculating", "using", "selecting", "accessing", and "determining" are interchangeable unless context indicates otherwise. For example, "generating", "calculating", or "determining" a parameter (or a signal) can refer to actively generating, calculating, or determining the parameter (or the signal) or can refer to using, selecting, or accessing the parameter (or signal) that is already generated, such as by another component or device. Additionally, "adjusting" and "modifying" can be used interchangeably. For example, "adjusting" or "modifying" a parameter can refer to changing the parameter from a first value to a second value (a "modified value" or an "adjusted value"). As used herein, "coupled" can include "communicatively coupled," "electrically coupled," or "physically coupled," and can also (or alternatively) include any combinations thereof. Two devices (or components) can be coupled (e.g., communicatively coupled, electrically coupled, or physically coupled) directly or indirectly via one or more other devices, components, wires, buses, networks (e.g., a wired network, a wireless network, or a combination thereof), etc. Two devices (or components) that are electrically coupled can be included in the same device or in different devices and can be connected via electronics, one or more connectors, or inductive coupling, as illustrative, non-limiting examples. In some implementations, two devices (or components) that are communicatively coupled, such as in electrical communication, can send and receive electrical signals (digital signals or analog signals) directly or indirectly, such as via one or more wires, buses, networks, etc. As used herein, "directly coupled" is used to describe two devices that are coupled (e.g., communicatively coupled, electrically coupled, or physically coupled) without intervening components.

Implementations disclosed herein include elements of a DAA system, or more generally of an aircraft flight information system. In particular, the aircraft flight information system is configured to generate a display including warning information and guidance information to pilots. The disclosure also includes methods of determining the information to be displayed. The display provides the pilot (which may be a remote pilot) with information indicating the location, identification, and other relevant information (e.g., estimated or projected flight path) related to aircraft in an airspace. The display also identifies (and prioritizes) potential hazards in the airspace using visual cues, which may be supplemented with audible cues. The display also provides the pilot with information about the aircraft being piloted, such as headings, altitudes/vertical profiles, and locations of waypoints. The display is constructed to reduce pilot workload by displaying a consistent set of information that is readily understandable to the pilot. For example, the aircraft flight information system avoids generating the display in a manner that switches between providing advice on where to avoid directing the aircraft (e.g., "no-go" advice) and where to direct the aircraft ("go" advice). Switching between go advice and no-go advice can lead to pilot confusion and increase pilot workload since the pilot has to evaluate each piece of information presented in the display in a timely manner to decide whether the information is go advice or no-go advice.

As used herein, proximity includes or refers to measurements of distance, measurements of time, or both, unless context indicates otherwise. For example, the proximity of two aircraft can be expressed as a distance (e.g., a number of meters or feet) based on positions of the aircraft or can be expressed as time (e.g., a number of seconds) based on the positions of the aircraft and the relative velocity between the aircraft. Additionally, as used herein, a separation violation condition can occur based on the proximity of the aircraft being less than a time-based separation threshold, less than a distance-based separation threshold, or both. For example, a time-based separation threshold can be compared to a distance-based proximity by converting the time-based separation threshold to a distanced using the relative velocity between the aircraft, or by converting the distance-based proximity to a time using the relative velocity between the aircraft.

In a particular implementation, the display includes guidance to the pilot in a manner that is consistent with the pilot's primary modes of aircraft control. The display is generated in a manner that graphically evolves the guidance format to convey information regarding the time-criticality (and in-turn priority) of various actions. The display also provides guidance in a manner that helps the pilot to associate and prioritize relevant information with particular navigation hazards, e.g., to indicate which other aircraft in an airspace represents the most urgent navigational hazard. By improving pilot situational awareness and decreasing pilot workload, the display supports more effective and efficient pilot decision making for complex airspace scenarios, such as airspaces that have multiple other aircraft that are navigational hazards, encounters in proximity to terrain, inclement weather, etc.

FIG. 1 is a block diagram that illustrates an example of a system 100 that includes an aircraft flight information system 104. The aircraft flight information system 104 is configured to facilitate operation of an ownship 202. The ownship 202 is an aircraft that is controlled via the aircraft flight information system 104. The term "ownship" is used herein to distinguish the aircraft controlled via the aircraft flight information system 104 from other aircraft 210 in an airspace. The aircraft flight information system 104 is configured to provide a display 150 that includes information descriptive of the airspace near the ownship 202. The aircraft flight information system 104 is also configured to send commands 116 to the ownship 202 based on pilot and/or autopilot flight control inputs. In FIG. 1, the aircraft flight information system 104 is a component of or integrated within a remote pilot station 102 to enable remote piloting of the ownship 202, or is a component of or integrated within the ownship 202 or within another aircraft. While FIG. 1 illustrates a single ownship 202, in some implementations, the aircraft flight information system 104 is associated with more than one ownship 202. In such implementations, the aircraft flight information system 104 can generate and present a separate display 150 for each ownship 202, or the aircraft flight information system 104 can generate and present a single display that includes information related to multiple ownships 202, as described further with reference to FIG. 6.

The aircraft flight information system 104 includes at least one processor 124, a memory 126, one or more input devices 128, one or more communication interfaces 118, a display device 130, and other output devices 156 (e.g., speakers, buzzers, lights, etc.). The memory 126, the input device(s) 128, the communication interface 118, the display device 130, and other output devices 156 are directly or indirectly coupled to the processor(s) 124. The memory 126 stores instructions 132 that are executable by the processor(s) 124 to perform various operations associated with receiving and presenting information descriptive of an airspace around the ownship 202, presenting flight advice to a pilot, receiving and processing flight control input from the pilot, and communicating commands to the ownship 202. Details of various operations that can be performed by the processor(s) 124 executing the instructions 132 are described with reference to FIGS. 7 and 8.

The communication interface 118 includes or is coupled to a transmitter 120, a receiver 122, or a combination thereof (e.g., a transceiver). The communication interface 118 is configured to enable communication with the ownship 202, the other aircraft 210, systems that gather or generate airspace data 114 descriptive of the airspace around the ownship 202, or a combination thereof. The communication can include sending and/or receiving information generated at the ownship 202 (e.g., audio, video, or sensor data), information generated at the other aircraft 210 (e.g., voice or transponder information), information generated at or collected by the aircraft flight information system 104 (e.g., commands), or a combination thereof. For example, the communication interface 118 is configured to receive commands from the processor(s) 124 and to cause the transmitter 120 to send the commands, such as a command 116, to the ownship 202. In FIG. 1, the command 116 is sent via a wireless transmission, such as via a terrestrial radiofrequency antenna 108 or via a satellite uplink between a satellite ground station antenna 110 and one or more satellites 112. In implementations in which the aircraft flight information system 104 is integrated within the ownship 202, the command 116 can be transmitted via a bus or on-board data communication architecture of the ownship 202.

The receiver 122 is configured to receive the airspace data 114 and/or other information via the terrestrial radiofrequency antenna 108, via the satellite uplink, via another source (such as a radar system or an air traffic control system), or a combination thereof. The airspace data 114 includes information such as the position, heading, velocity, altitude, and type of the ownship 202 and of each of the other aircraft 210. The airspace data 114 can also include other information, such as notices to airmen, terrain and weather information. The airspace data 114 is provided to the processor(s) 124, stored in the memory 126, or both.

In FIG. 1, the instructions 132 includes flight control instructions 134, flight path estimation instructions 136, time remaining to act (TRTA) estimation instructions 138, and graphical user interface (GUI) generation instructions 140. The flight control instructions 134, the flight path estimation instructions 136, the TRTA estimation instructions 138, and GUI generation instructions 140 are illustrated as separate modules within the instructions 132 in FIG. 1 merely as a convenience. In some implementations, two or more modules corresponding to the flight control instructions 134, the flight path estimation instructions 136, the TRTA estimation instructions 138, and GUI generation instructions 140 are combined. To illustrate, the flight path estimation instructions 136, the TRTA estimation instructions 138, and the GUI generation instructions 140 can be combined into an application, such as aircraft flight information application 934 of FIG. 9. In other implementations, the instructions 132 include different modules or more modules than are illustrated in FIG. 1. To illustrate, the flight path estimation instructions 136 can be broken into several modules, such as a module to estimate a future flight path of the ownship 202 based on the current flight path of the ownship 202 and a module to determine consequences of various alternate flight paths that the ownship 202 could take. As another illustrative example, one or more other modules may estimate a future flight path of the other aircraft 210 based on the current flight path of the other aircraft 210 and determine consequences of various alternate flight paths that the other aircraft 210 could take. In this illustrative example, the one or more other modules may select an estimated flight path from the set of candidate alternate flight paths for the other aircraft 210 for further processing (e.g., a block 812 of FIG. 8). Flight path estimation instructions 136 may estimate the future flight paths as linear or non-linear flight paths.

The flight control instructions 134 are executable by the processor(s) 124 to cause or enable the processor(s) 124 to receive input from a pilot via the input device(s) 128 and to generate commands (such as the command 116) for the ownship 202 based on the input. In some implementations, the flight control instructions 134 can also, or in the alternative, include an autopilot system that controls the ownship 202 autonomously or semi-autonomously (e.g., autonomously within pilot specified parameters). In some implementations, the input device(s) 128 include traditional aircraft flight input devices, such as a stick, a throttle handle, a yoke, pedals, or other aircraft inceptors. In other implementations, the input device(s) 128 include computer/gaming type input devices, such as a mouse, a keyboard, a joystick, or a game system controller. In yet other implementations, the input device(s) 128 include a combination of traditional aircraft flight input device, computer/gaming-type input device, other devices (e.g., gesture-, speech-, or motion-based controllers), or a combination thereof. The pilot can use the input device(s) 128 to directly command flight control effectors of the ownship 202, such as by moving an input device in a manner that indicates a specific aileron position or a specific roll angle. Alternatively, or in addition, the pilot can use the input device(s) 128 to designate waypoints and/or operating parameters, and the flight control instructions 134 can command flight control effectors of the ownship 202 based on the waypoint and/or operation parameters.

The flight control instructions 134 are also executable to receive and analyze the airspace data 114 or a portion thereof to determine a current (or reported) flight status of the ownship 202. The flight status of the ownship 202 includes, for example, a location of the ownship 202, a heading of the ownship 202, a velocity of the ownship 202, an altitude of the ownship 202, etc. The flight control instructions 134 generate the command 116 based on the flight status of the ownship 202, the pilot input, aircraft characteristics 144 of the ownship 202, or a combination thereof. The aircraft characteristics 144 indicate flight dynamics and operational limitations of the ownship 202, such as a maximum operational altitude, a maximum operational speed, a turning rate limitation, a maximum climb limitation, a stall speed, other aerodynamic limits, or a combination thereof. In addition to storing information about the ownship 202, the aircraft characteristics 144 can include similar information about the other aircraft 210.

The GUI generation instructions 140 are executable by the processor(s) 124 to cause or enable the processor(s) 124 to generate the display 150 and to provide the display 150 to the display device(s) 130. In a particular implementation, the display 150 include a map 152 representing a geographic area near the ownship 202 and graphical features 154 that represent the ownship 202, the other aircraft 210, flight status information, flight advice, and other information, as described in more detail with reference to FIGS. 3-6. The content and arrangement of the graphical features 154 can be determined based on settings 158 in the memory 126. The settings 158 indicate pilot display preferences and other user selectable preferences regarding presentation of information by the aircraft flight information system 104.

The flight path estimation instructions 136 and the TRTA estimation instructions 138 are executable to determine flight advice presented in the display 150. In particular, the flight path estimation instructions 136 are configured to estimate a future flight path of the ownship 202 and to estimate a future flight path of the other aircraft 210 in the airspace. For example, the flight path estimation instructions 136 can determine a current heading and speed of each aircraft in the airspace (including the ownship 202 and the other aircraft 210) from the airspace data 114, and can extrapolate the future flight path of each aircraft in the airspace based on the respective current heading and speed. The flight path estimation instructions 136 can also determine an estimated proximity between the ownship 202 and the other aircraft 210 based on the future flight path of each of the aircraft in the airspace. The flight path estimation instructions 136 compare the estimated proximity between the ownship 202 and the other aircraft 210 to various thresholds 142 to determine whether the estimated future flight paths are expected to result in a separation violation condition. For example, the flight path estimation instructions 136 can determine a point of nearest approach of the ownship 202 and the other aircraft 210 based on the future flight paths and use the proximity at the point of nearest approach as the estimated proximity to determine whether a separation violation condition is expected to occur. In another example, the flight path estimation instructions 136 can estimate the future flight paths in time intervals (e.g., 5 second intervals) and can use the estimated proximity for each time interval to determine whether a separation violation condition is expected to occur.

Generally, a separation violation condition occurs if a first aircraft (e.g., the ownship 202) is less than a separation threshold (e.g., a threshold distance or a threshold time) from a second aircraft (e.g., one of the other aircraft 210). The separation threshold can be specified by the pilot (e.g., as part of the settings 158), can be specified by an organization associated with the ownship 202 or the other aircraft 210 (e.g., a military, government, or commercial organization), can be specified by a regulatory agency, or can be specified by a standards organization. In some implementations, the thresholds 142 can include multiple different separation thresholds, and the specific separation threshold used to determine whether a separation violation condition is expected to occur is determined based on conditions present when the flight paths are estimated. For example, the specific separation threshold used can depend on weather conditions, the aircraft type of the ownship 202, the class of airspace, changes in the ownship 202 performance, the aircraft type of the other aircraft 210, mission parameters, and so forth. To illustrate, a smaller separation threshold can be used when the ownship 202 and the other aircraft 210 are both unmanned aircraft than may be used if one of the ownship 202 or the other aircraft 210 is a manned aircraft.

If the flight path estimation instructions 136 determine that a separation violation condition is expected to occur based on the estimated flight paths, the TRTA estimation instructions 138 use the airspace data 114 and the aircraft characteristics 144 to estimate how long the pilot has to respond (i.e., the time remaining to act) to avoid the separation violation condition. In a particular implementation, the TRTA estimation instructions 138 determine, based on the airspace data 114 and the aircraft characteristics 144, a navigation alert region. As explained in more detail with reference to FIG. 2, the navigation alert region is an area in which the separation violation condition will occur (e.g., will be unavoidable) if the ownship 202 flies into the navigation alert region and the other aircraft 210 follows the future flight path estimated by the flight path estimation instructions 136. The TRTA estimation instructions 138 provide data to the GUI generation instructions 140 to cause the TRTA, a graphical feature representing the navigation alert region, other information, or a combination thereof, to be represented in the display 150.

In some implementations, the flight path estimation instructions 136 are also configured to determine one or more alternate flight paths for the ownship 202 and to determine whether each of the one or more alternate flight paths would result in a separation violation condition. The one or more alternate flight paths can be determined based on a current or reported flight status of the ownship 202 and the aircraft characteristics 144. For example, a particular alternate flight path can be determined based on a current heading of the ownship 202 and a maximum turning limitation of the ownship 202. If any of the alternate flight paths determined by the flight path estimation instructions 136 would result in a separation violation condition, the flight path estimation instructions 136 can provide data to the GUI generation instructions 140 to generate and display flight advice in the display 150. To illustrate, a graphical feature (e.g., an advice band) can be displayed to indicate to the pilot that the pilot should not modify the flight path of the ownship 202 to correspond to the alternate flight path(s) since this modification would result in a separation violation condition.

In a particular implementation, the flight path estimation instructions 136, the TRTA estimation instructions 138, or both, can provide data to the flight control instructions 134 to limit operations that the pilot can perform based on a projected separation violation condition. For example, after the TRTA estimation instructions 138 identify a navigation alert region, the TRTA estimation instructions 138 can provide data identifying boundaries of the navigation alert region to the flight control instructions 134, and the flight control instructions 134 can prevent the pilot from designating a waypoint for the ownship 202 within the navigation alert region. For example, if the pilot provides input that designates a waypoint for the ownship 202, the command 116 can be generated and sent to the ownship 202 based on a determination that the waypoint is not located in the navigation alert region. Alternatively, the flight control instructions 134 can allow the pilot to designate the waypoint within the navigation alert region, but may require the pilot to perform one or more additional steps, such as a confirming that the pilot understand that the waypoint is within the navigation alert region. For example, based on determining that the waypoint is within the navigation alert region, the aircraft flight information system 104 can generate output advising the pilot that the waypoint is within the navigation alert region, and await confirmation from the pilot before setting the waypoint. Thus, the aircraft flight information system 104 generates the display 150 in a manner that is consistent with the pilot's primary modes of aircraft control.

The display 150 is generated to graphically evolve the guidance format to convey information regarding the time-criticality (and in-turn priority) of various actions. For example, the arrangement of and display format (e.g., color) of the graphical features 154 of the display 150 are updated as conditions in the airspace change. The display 150 also provides guidance in a manner that helps the pilot to associate and prioritize relevant information with particular navigation hazards, e.g., to indicate which other aircraft 210 in an airspace is the most urgent navigational hazard. By improving pilot situational awareness and decreasing pilot workload, the aircraft flight information system 104 supports more effective and efficient pilot decision making for complex airspace scenarios, such as airspaces that have multiple other aircraft that are navigational hazards, encounters in proximity to terrain, inclement weather, etc.

Figure 2:
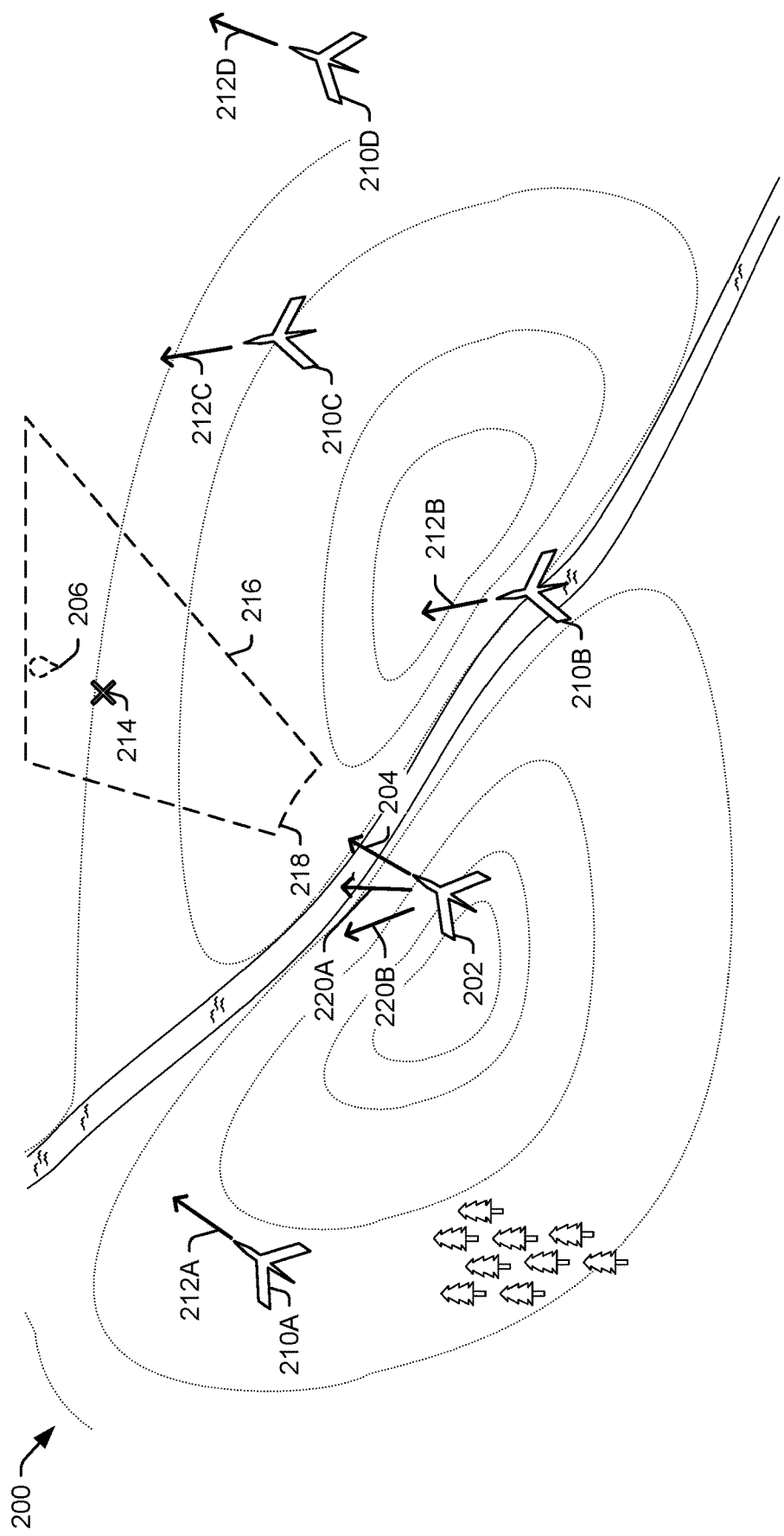
FIG. 2 is a diagram that illustrates an example of an airspace in which multiple aircraft are present.

FIG. 2 is a diagram that illustrates an example of an airspace 200 in which multiple aircraft are present. The aircraft include the ownship 202 and multiple other aircraft 210, including aircraft 210A, 210B, 210C, and 210D. FIG. 2 also illustrates a heading of each aircraft in the airspace 200. For example, the ownship 202 has a heading 204, the aircraft 210A has a heading 212A, the aircraft 210B has a heading 212B, the aircraft 210C has a heading 212C, and the aircraft 210D has a heading 212D. In the example illustrated in FIG. 2, the heading 204 of the ownship 202 is toward a waypoint 206.

Extrapolating (e.g., linearly projecting) the heading 204 of the ownship 202 and the heading 212B of the aircraft 210B shows that an estimated flight path of the ownship 202 and an estimated flight path of the aircraft 210B intersect at a projected intersection location 214. In other implementations, the estimated flight path is based on a nonlinear projection. The projected intersection location 214 is within a box identifying boundaries of a navigation alert region 216. The navigation alert region 216 is an area in which a separation violation condition will occur if the ownship 202 follows the estimated flight path of the ownship 202 and the aircraft 210B follows the estimated flight path of the aircraft 210B. Thus, to avoid a separation violation condition, the flight path of the ownship 202 should be changed to avoid passing the closest boundary 218 of the navigation alert region 216. As explained further with reference to FIGS. 3-6, the aircraft flight information system 104 of FIG. 1 can include a graphical feature (e.g., a color-coded geometric shape) in the display 150 to identify the boundaries of the navigation alert region 216. Navigation alert regions 216 can also be generated and concurrently displayed for one or more of the other aircraft 210 for which a separation violation condition is determined.

FIG. 2 also illustrates alternate flight paths 220, including alternate flight paths 220A and 220B, to which the ownship 202 could turn to avoid entering the navigation alert region 216. However, in FIG. 2, the alternate flight paths 220 represent alternate flight paths that the ownship 202 should avoid. The alternate flight paths 220 are both toward the port side of the ownship, and the aircraft 210A is to the port side of the ownship 202. Projecting (e.g., extrapolating) a future flight path of the aircraft 210A along its current heading 212A, and projecting (e.g., extrapolating) a future flight path of the ownship 202 along either of the alternate flight paths 220 or any flight path between the alternate flight paths 220 is expected to cause a separation violation condition between the ownship 202 and the aircraft 210A. As explained further with reference to FIGS. 3-6, the aircraft flight information system 104 of FIG. 1 can include a graphical feature (e.g., an advice band) in the display 150 to identify a range of alternate headings that the ownship 202 should avoid.

Figure 3:
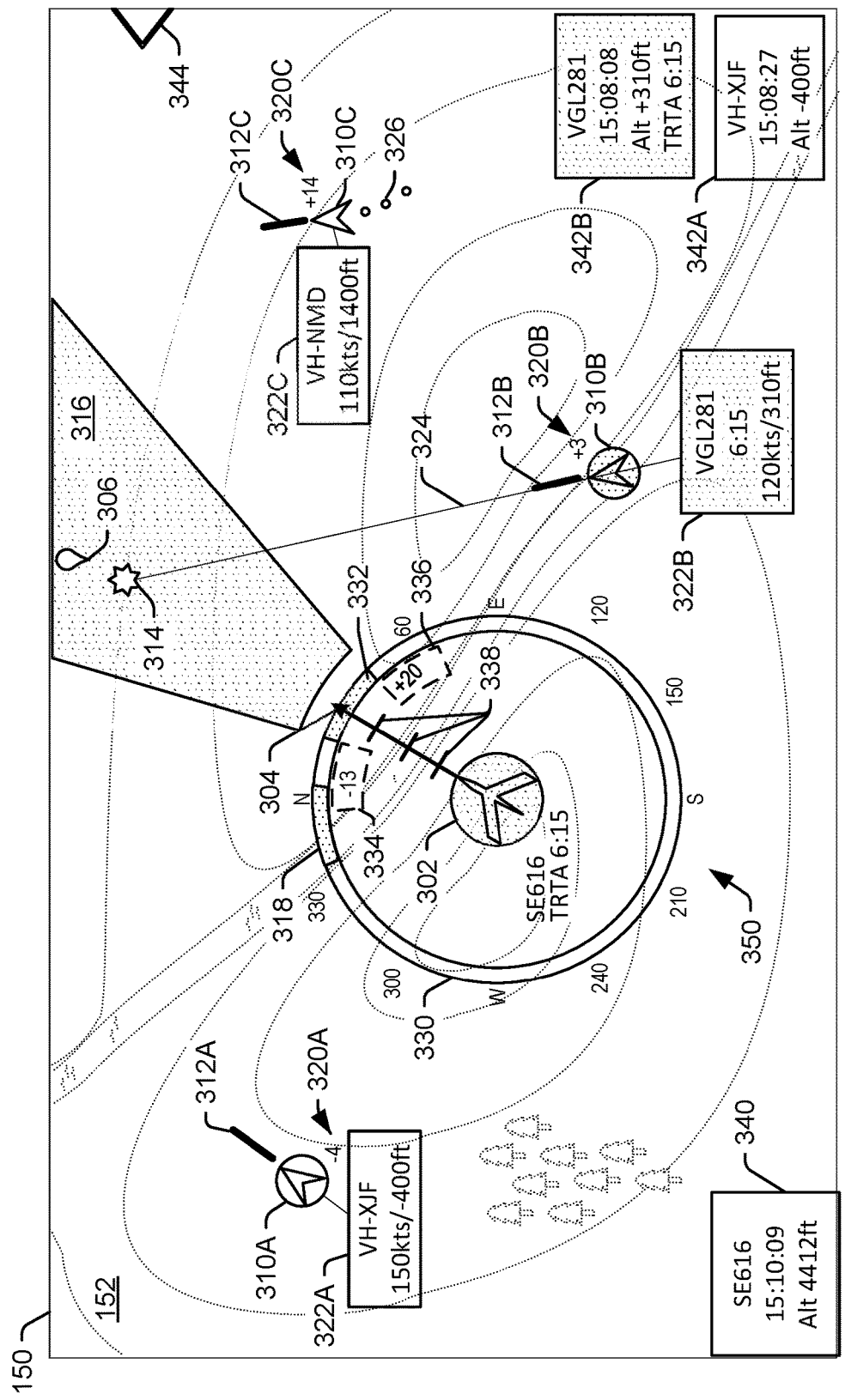
FIG. 3 is a diagram that illustrates a first example of an aircraft flight information display providing information regarding the airspace of FIG. 2.
Figure 4:
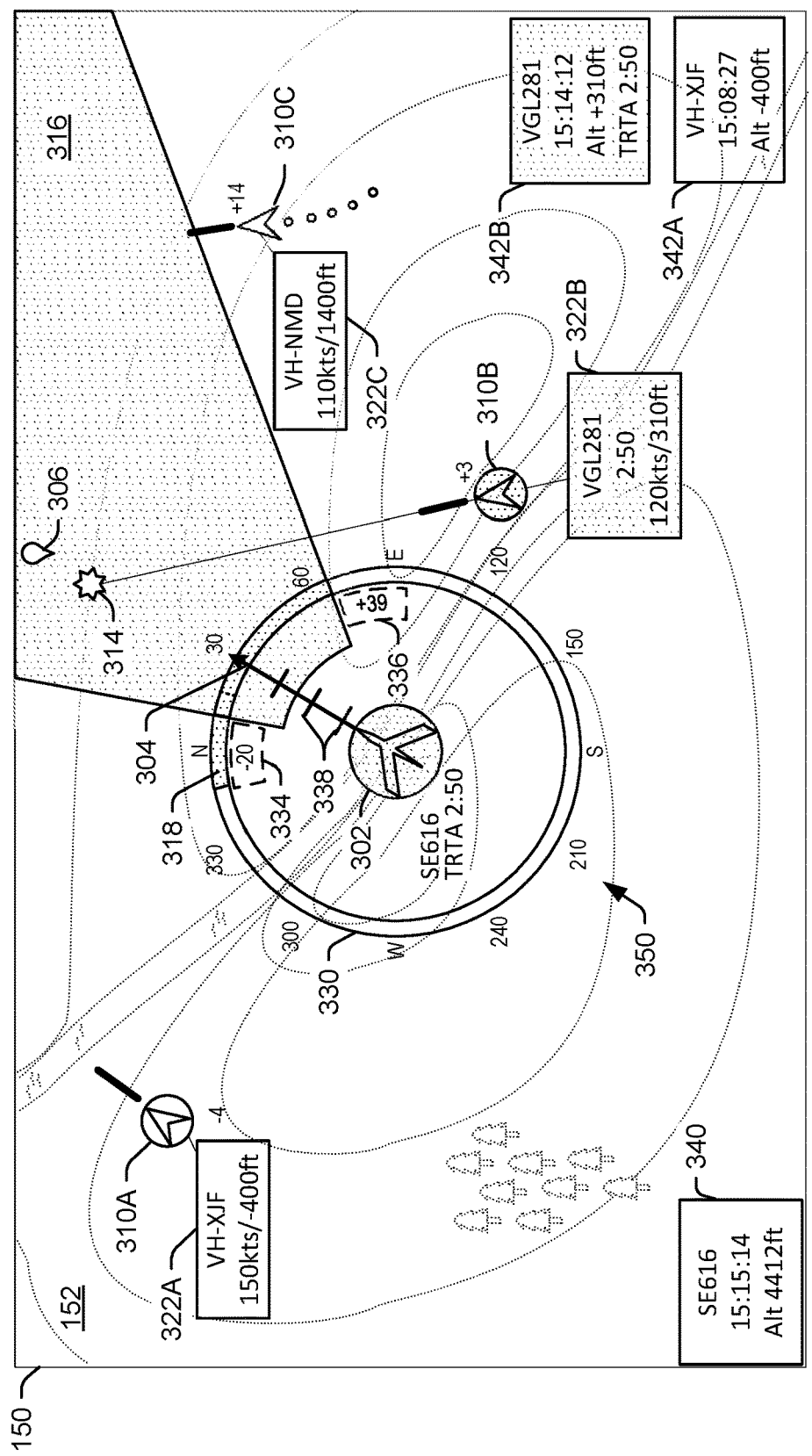
FIG. 4 is a diagram that illustrates a second example of an aircraft flight information display providing information regarding the airspace of FIG. 2.
Figure 5:
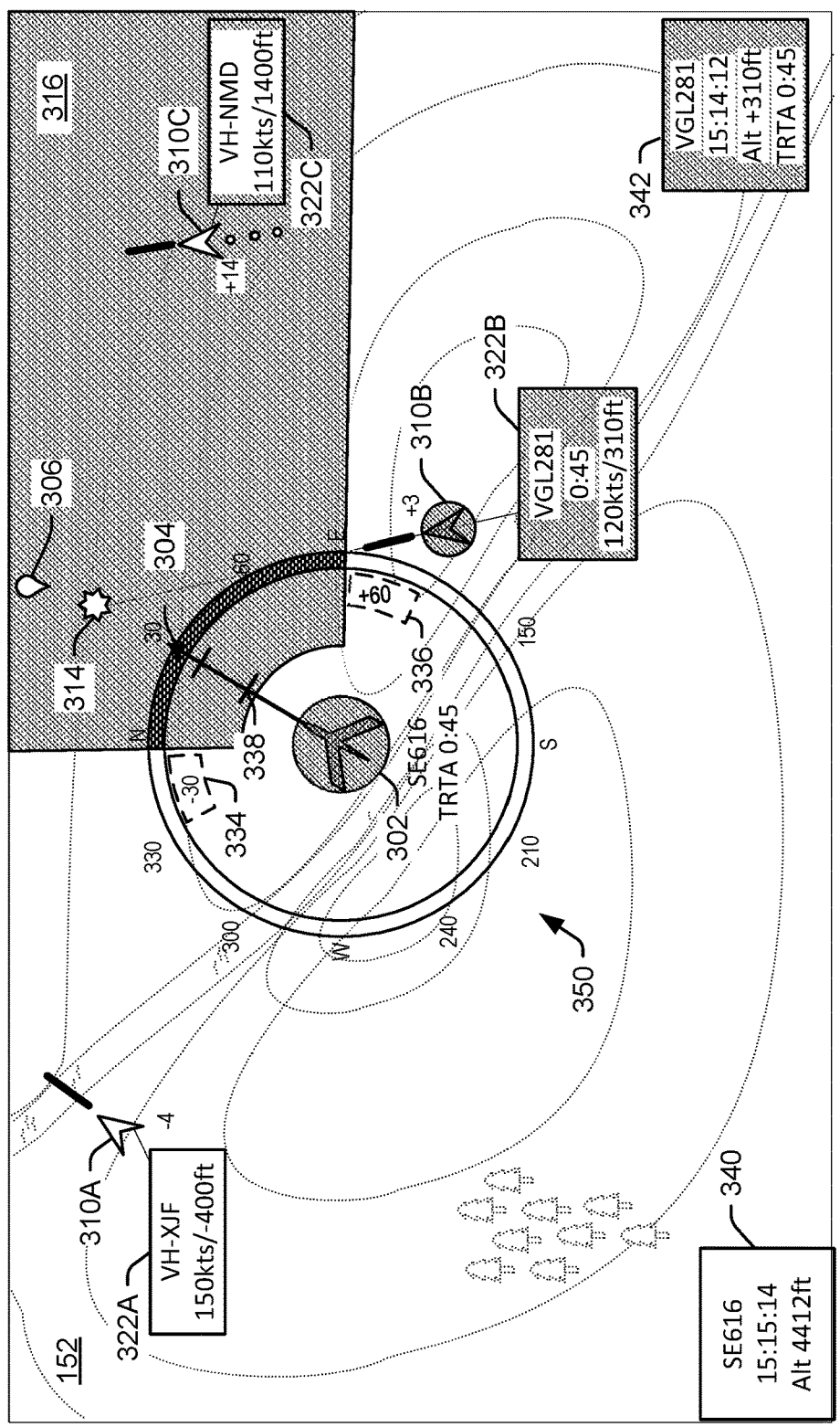
FIG. 5 is a diagram that illustrates a third example of an aircraft flight information display providing information regarding the airspace of FIG. 2.
Figure 6:
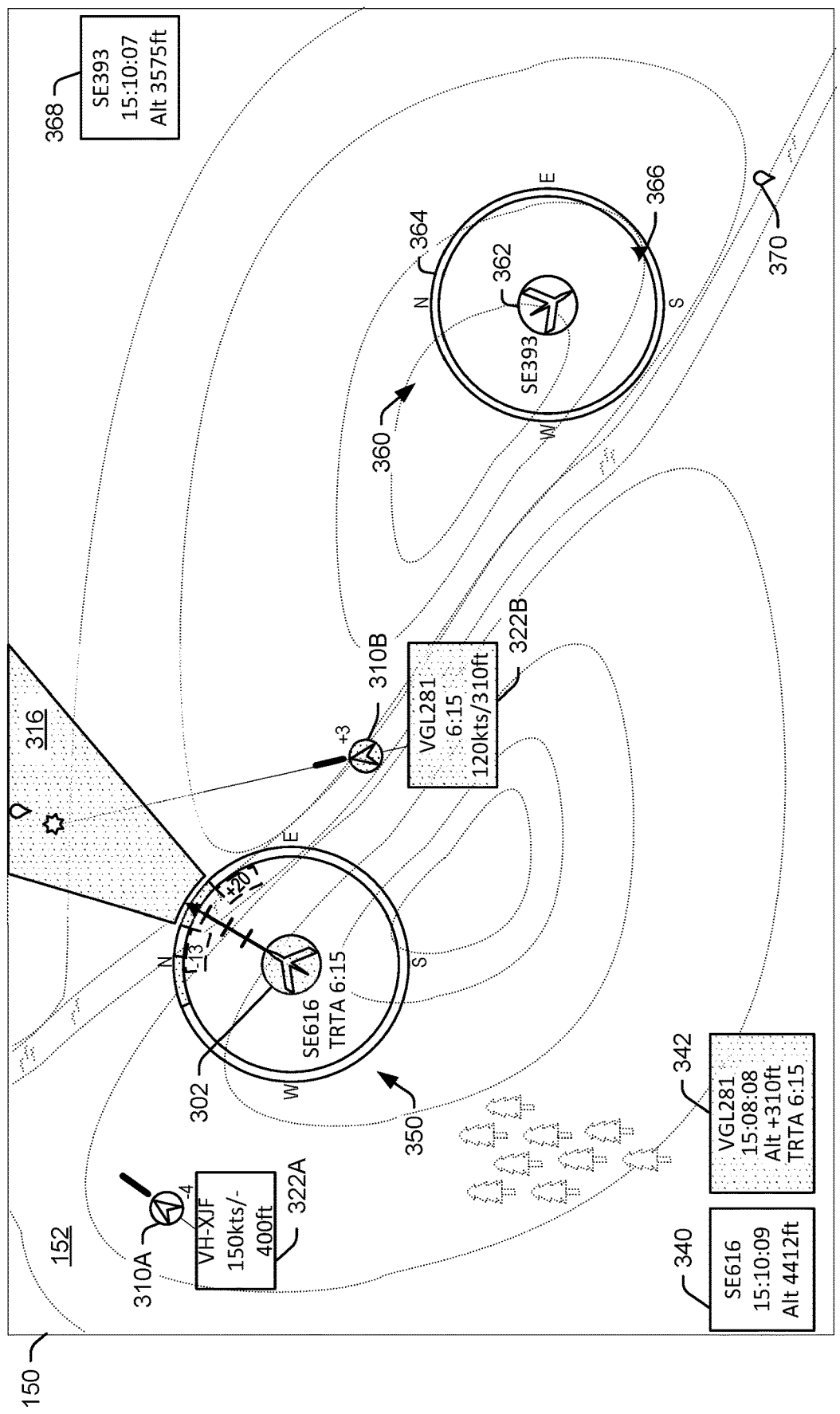
FIG. 6 is a diagram that illustrates a fourth example of an aircraft flight information display providing information regarding the airspace of FIG. 2.

FIGS. 3-6 illustrate examples of aircraft flight information displays (e.g., examples of the display 150 of FIG. 1) for various airspace conditions. In particular, FIG. 3 is an example of the display 150 corresponding to the airspace 200 of FIG. 2. FIGS. 4 and 5 illustrate examples of the display 150 corresponding to the airspace 200 at different times following the illustration of the airspace 200 in FIG. 2 (e.g., after the aircraft 210 and the ownship 202 have flown along their respective flight paths). FIG. 6 illustrates an example of the display 150 in an implementation in which the aircraft flight information system 104 of FIG. 1 is associated with more than one ownship 202.

In each of FIGS. 3-6, the display 150 includes the map 152 and graphical features 154 overlaying the map 152 and representing various aspects of the airspace 200, the aircraft 210, and the ownship 202. Unless indicated otherwise, the graphical features 154 overlaying the map 152 are semi-transparent to allow visibility of the map 152 through each graphical feature 154, including for example information boxes, geometric shapes representing navigation alert regions, advice bands, etc. The graphical features 154 include graphical features 310A, 310B, and 310C representing the aircraft 210A, 210B, and 210C, respectively. The graphical features 154 also include a color-coded geometric shape 316 representing the navigation alert region 216, an intersection icon 314 representing the projected intersection location 214, and a waypoint icon 306 representing the waypoint 206. The graphical features 154 further include a set 350 of graphical features associated with the ownship 202, include rings 330 representing a compass rose around a graphical feature 302 representing the ownship 202. The heading 204 of the ownship 202 is represented in the display 150 by a heading indicator 304, and the headings 212 of the other aircraft 210 are represented in the display 150 by respective heading indicators 312.

Additionally, the graphical features 310 representing the aircraft 210 are associated with information boxes 322 that provide information about the respective aircraft 210. For example, the graphical feature 310A is associated with the information box 322A, which includes an aircraft identifier ("VH-XJF") of the aircraft 210A as well as information indicating speed and relative altitude (e.g., speed=150 kts, and relative altitude=−400 feet) of the aircraft 210A. The relative altitude refers to the altitude of the aircraft 210 relative to the altitude of the ownship 202. Thus, the relative altitude −400 feet associated with the aircraft 210A in the information box 322A indicates that the aircraft 210A is at an altitude that is approximately 400 feet lower than an altitude of the ownship 202. In FIG. 2, the relative altitude of each aircraft 210 is also indicated by a relative altitude indicator 320, which indicates the relative altitude in hundreds of feet. Thus, the relative altitude indicator 320A, which shows a relative altitude of "−4", also indicates that the aircraft 210A is 400 feet lower than the ownship 202. In some implementations, a position of the relative altitude indicator 320 indicates whether the corresponding aircraft 210 is above or below the ownship 202 (e.g., whether the relative altitude has a positive or a negative value). For example, in FIG. 3, the relative altitude indicator 320A is below (i.e., closer to the bottom of the display 150 than) the graphical feature 310A representing the aircraft 210A to indicate that the aircraft 210A is at a lower altitude that the ownship 202. Similarly, the relative altitude indicator 320B is above (i.e., closer to the top of the display 150 than) the graphical feature 310B representing the aircraft 210B to indicate that the aircraft 210B is at a higher altitude that the ownship 202. Positioning the relative altitude indicator 320 above or below the graphical feature 310 representing an aircraft 210 provides an additional visual cue to reduce the pilot's workload in evaluating altitude information.

An ownship information box 340 is also illustrated in FIG. 3. The ownship information box 340 includes an aircraft identifier ("SE616") of the ownship 202 as well as information indicating an altitude (e.g., 4412 feet) of the ownship 202, and a time (e.g., "15:10:09") at which the information presented in the ownship information box 340 was generated (e.g., a timestamp received from the ownship 202 in the airspace data 114 or a timestamp applied to the airspace data 114 when the airspace data 114 is received). As illustrated in FIG. 6, the display 150 can include graphical features representing more than one ownship (e.g., the set 350 of graphical features representing the ownship 202 and a set 360 of graphical features representing another ownship). In this situation, each ownship is associated with a respective ownship information box. For example, the ownship 202 is associated with the ownship information box 340, and the other ownship is associated with an ownship information box 368. To help pilots rapidly identify which the ownship information box 340, 368 is associated with which ownship, each ownship information box 340, 368 can be visually linked (e.g., color coded, linked by a line, or linked by proximity or display position) to the corresponding graphical feature 302, 362 representing each ownship. For example, the ownship information box 340 and the graphical feature 302 representing the ownship 202 can be shown in a first color, and the ownship information box 368 and the graphical feature 362 representing the other ownship can be shown in a second color that is visually distinct from the first color. As another example, the ownship information box 340 can be positioned on a side of the display 150 that is closest to the graphical feature 302 representing the ownship 202, and the ownship information box 368 can be positioned on a different side of the display 150 that is closer to the graphical feature 362 representing the other ownship.

In some implementations, the graphical features 310 representing the aircraft 210 are visually distinct to help pilots to rapidly identify and prioritize navigation hazards. In FIG. 3, three different graphical features 310 are used to identify aircraft 210 representing different navigation hazard levels. For example, the aircraft 210D is outside the range of the display 150 and accordingly is associated with a lowest level of navigation hazard. Thus, the aircraft 210D is represented in the display 150 of FIG. 3 merely by an "other traffic" indicator icon 344. The aircraft 210C is within the range of the display 150, but no projected flight path of the ownship 202 results in a separation violation condition between the ownship 202 and the aircraft 210C. Accordingly, the aircraft 210C is represented in the display 150 by a graphical feature 310C (e.g., a bare aircraft icon) that simply indicates presence of an aircraft (e.g., does not indicate a navigation hazard). The aircraft 210A is within the range of the display 150 and one or more possible alternate flight paths of the ownship 202 result in a separation violation condition between the ownship 202 and the aircraft 210A. Accordingly, the aircraft 210A is represented in the display 150 by a graphical feature 310A (e.g., a circled aircraft icon) that indicates an aircraft that could, under some circumstances, be a navigation hazard. The aircraft 210B is within the range of the display 150 and a current flight path of the ownship 202 is expected to result in a separation violation condition between the ownship 202 and the aircraft 210B. Accordingly, the aircraft 210B is represented in the display 150 by a graphical feature 310B (e.g., a highlighted, circled aircraft icon) that indicates an aircraft that is a current navigation hazard. The graphical features 310 can also, or in the alternative, include other features to help the pilot quickly prioritize navigational hazards, such as color codes representing various navigational hazard levels.

In FIGS. 3-6, the aircraft 210A and 210B are associated with supplemental information boxes 342 because the aircraft 210A and 210B have been identified as current or possible navigation hazards. The supplemental information box 342B includes information indicating an identifier (e.g., "VGL281") of the aircraft 210B, a time (e.g., "15:08:08") at which the information presented in the supplemental information box 342B was generated, a relative altitude of the aircraft 210B, and the time remaining to act (TRTA) (e.g., 6:15 minutes) to avoid entering the navigation alert region 216 associated with a loss of separation between the ownship 202 and the aircraft 210B. The supplemental information box 342A includes similar information, except that no TRTA is displayed since the current heading 204 of the ownship 202 will not result in a separation violation condition with respect to the aircraft 210A.

When multiple navigations hazards are present, as in the display 150 of FIG. 3, the supplemental information boxes 342 for the navigation hazards are sorted in order of priority, with the highest priority displayed highest in the display 150. Thus, the supplemental information box 342B is displayed above the supplemental information box 342A. In some implementations, the highest priority navigation hazard is the navigation hazard with the shortest TRTA. The highest priority navigation hazard can also, or in the alternative, be determined based on other parameters, such as the nature of the navigation hazard (e.g., acting to avoid another unmanned aircraft may be a lower priority that acting to avoid a manned aircraft), based on mission parameters, etc.

In some implementations, when multiple navigations hazards are present, the TRTA associated with the highest priority navigation hazard may be displayed with the identifier of the ownship in the set 350 of graphical features associated with the ownship 202. In some implementations, displaying or not displaying the TRTA for the highest priority navigation hazard is a pilot selectable display preference. In some such implementations, the TRTA for the highest priority navigation hazard is automatically (e.g., regardless of pilot's display preferences) displayed with the identifier of the ownship 202 when the TRTA is less than (or less than or equal to) a threshold.

Information presented in the information boxes 322, 340, 342 can be selectable based on the pilot's display preferences or other preferences in the settings 158 of the aircraft flight information system 104. For example, some pilots may prefer to only show a minimum set of information, such as the relative altitude indicator 320 and identifier (e.g., "VH-XJF") for each aircraft 210, in which case the information boxes 322 may not be shown. Other features of FIGS. 3-6 are also configurable. For example, in FIG. 3, the graphical feature 310C representing the aircraft 210C is trailed by dots 326 (also referred to as "bread crumbs") which mark a prior flight path of the aircraft 210C. Some pilots may not find the dots 326 useful, or may find them distraction, in which case such pilots can adjust the settings 158 such that the dots 326 are not displayed.

As described above, the color-coded geometric shape 316 represents the navigation alert region 216 of FIG. 2. The color-coded geometric shape 316 has a size, shape, and position that corresponds to the boundaries of the navigation alert region 216. Additionally, a color of the color-coded geometric shape 316 is selected based on the time remaining to act. For example, the color-coded geometric shape 316 has a first color (e.g., amber, yellow, or another color) when the time remaining to act to avoid entering the navigation alert region 216 has a first value, and the color-coded geometric shape 316 has a second color (e.g., red or another color) when the time remaining to act to avoid entering the navigation alert region 216 has a second value. In this example, the first color is different from (e.g., visually distinguishable from) the second color, and the first value is different from (e.g., greater than) the second value. To illustrate, if the time remaining to act is greater than (or greater than or equal to) a threshold, the color-coded geometric shape 316 may be yellow or amber, and if the time remaining to act is less than (or less than or equal to) the threshold, the color-coded geometric shape 316 may be red. In other implementations, other visual distinctions, in addition to or instead of a color distinction, can be used to alert the pilot to the time remaining to act. For example, the color-coded geometric shape 316 can flash as the time remaining to act decreases. Further, in some implementations, other alert mechanisms can be used in addition to the color-coded geometric shape 316. For example, an audible alert can be presented to the pilot via the other output devices 156 when the time remaining to act is less than (or less than or equal to) a particular value.

In FIGS. 3-6, the set 350 of graphical features associated with the ownship 202 includes a time scale 338 indicating an estimated time until the ownship 202 enters the navigation alert region 216. If no other aircraft 210 in the airspace 200 with the ownship 202 represents a current navigational hazard (e.g., if the flight paths estimated by the flight path estimation instructions 136 of FIG. 1 are not predicted to result in a separation violation condition) then no navigation alert region 216 exists, and no time scale 338 shown. Alternatively, or in addition, a distance between the graphical feature 302 representing the ownship 202 and one or both of the rings 330 can indicate a time scale. For example, in FIG. 3, the distance between each of the marks of the time scale 338 corresponds to approximately one minute of flight time at the current speed of the ownship 202, the distance between the graphical feature 302 representing the ownship 202 and the inner ring of the rings 330 corresponds to approximately four minute of flight time at the current speed of the ownship 202, and the distance between the graphical feature 302 representing the ownship 202 and the outer ring of the rings 330 corresponds to approximately five minutes of flight time at the current speed of the ownship 202. The flight time represented by each mark of the time scale 338, the rings 330, or both, can be adjusted by the pilot using the settings 158.

In FIGS. 3-6, the set 350 of graphical features associated with the ownship 202 includes one or more advice bands, such as advice bands 318 and 332. Each advice band 318, 332 is a visual indication of a range of headings that is projected to result in separation violation conditions. For example, in FIG. 3, the advice band 332 indicates that a range of headings from about −13 degrees (e.g., 13 degrees to port) from the current heading 204 of the ownship 202 to about +20 degrees (e.g., 20 degrees to starboard) from the current heading 204 of the ownship 202 are expected to result in separation violation conditions between the ownship 202 and the aircraft 210B. Likewise, the advice band 318 indicates that a range of headings from about −26 degrees (e.g., 26 degrees to port) from the current heading 204 of the ownship 202 to about −46 degrees (e.g., 46 degrees to port) from the current heading 204 of the ownship 202 are expected to result in separation violation conditions between the ownship 202 and the aircraft 210B. In some implementations, the advice bands may be configured (e.g., via the settings 158) to display the range of headings in an "absolute" sense to conform with standard compass notation. This configuration is adjusted by the pilot.

In FIG. 3, since the current heading 204 of the ownship 202 is within the range of headings associated with the advice band 332, the advice band 332 is displayed with numerical values 334, 336. The numerical values provide the pilot with a quick quantification of a magnitude of the course change needed to avoid entering the navigation alert region 216. A first numerical value 334 indicates a difference between the heading 204 of the ownship 202 and an estimated flight path along a first boundary of the navigation alert region 216. Likewise, a second numerical value 336 indicates a difference between the heading 204 of the ownship 202 and an estimated flight path along a second boundary of the navigation alert region 216. For example, in FIG. 3, the advice band 332 indicates the relative change in the current heading 204 of the ownship 202 required to ensure the ownship 202 does not enter the navigation alert region 216. In the example of FIG. 3, the advice band 332 indicate a change of ownship 202 heading 204 of −13 degrees (e.g., 13 degrees to port) to +20 degrees (e.g., 20 degrees to starboard) would be required for the ownship 202 to remain clear of the navigation alert region 216.

In some implementations, the rings 330, other portions of the set 350 of graphical features associated with the ownship 202, or a combination thereof, can be color-coded to indicate a current hazard level associated with the ownship 202. For example, in FIG. 3, the graphical feature 302 representing the ownship 202 is the same color (indicated by the fill pattern) as the color-coded geometric shape 316. In contrast, in FIG. 5, the graphical feature 302 representing the ownship 202 and the color-coded geometric shape 316 have a different color (indicated by the different fill pattern) to indicate a higher navigation hazard level in the circumstances associated with FIG. 5. Further, FIG. 6 illustrates an example of another ownship associated with a second set 360 of graphical features, as described further below. The other ownship of FIG. 6 is not associated with any navigational hazard, and therefore the graphical feature 362 representing the other ownship has a different color (indicated the lack of a fill pattern) than the graphical feature 302 representing the ownship 202 in FIGS. 3 and 5.

FIG. 4 illustrates an example of the display 150 at some period of time subsequent to the circumstance illustrated in FIG. 3 and after the ownship 202 and the each of the aircraft 210 have continued without changing course. Thus, in FIG. 4, the ownship 202 is closer to the navigation alert region 216 than at the time illustrated in FIG. 3. In FIG. 4, the color-coded geometric shape 316 extends within the rings 330, and the TRTA has decreased to 2:50 minutes, as indicated in the supplemental information box 342 and the time scale 338. Also, the magnitude of the course change that the ownship 202 must make to avoid entering the navigation alert region 216 has increased, as indicated by the first numerical value 334 and the second numerical value 336. Further, due to the relative movement of the ownship 202 and the aircraft 210A, the advice band 318 associated with the aircraft 210A has moved clockwise within the rings 330 and partially overlaps the color-coded geometric shape 316 representing the navigation alert region 216.

FIG. 5 illustrates an example of the display 150 at some period of time subsequent to the circumstance illustrated in FIG. 4 and after the ownship 202 and the each of the aircraft 210 have continued without changing course. Thus, in FIG. 5, the ownship 202 is closer to the navigation alert region 216 than at the time illustrated in FIG. 4. In FIG. 5, a color of the color-coded geometric shape 316 has been changed to indicate that the TRTA (e.g., 0:45 minutes in FIG. 5, as indicated by the supplemental information box 342 and the time scale 338) is less than (or less than or equal to) a threshold. Additionally, graphical features associated with the aircraft 210B have been altered to highlight the urgency of action. For example, the graphical feature 310B representing the aircraft 210B, the information box 322B associated with the aircraft 210B, and the supplemental information box 342 have all been changed in FIG. 5 (relative to FIG. 4) to indicate that the aircraft 210B is a current and urgent navigation hazard. Also, the magnitude of the course change that the ownship 202 must make to avoid entering the navigation alert region 216 has increased, as indicated by the first numerical value 334 and the second numerical value 336. Further, due to the relative movement of the ownship 202 and the aircraft 210A, the advice band 318 and the supplemental information box 342A associated with the aircraft 210A have been removed, indicating that no separation violation condition is expected to occur between the ownship 202 and the aircraft 210A due to any possible heading change of the ownship 202.

FIG. 6 is a diagram that illustrates another example of the display 150. For purposes of generating the display 150 of FIG. 6, the airspace 200 of FIG. 2 is considered not to include the aircraft 210C and 210D, and is considered to include another ownship (not shown in FIG. 2). A location of the other ownship is represented by graphical feature 362 in FIG. 6. In addition, the display 150 of FIG. 6 corresponds in time with the display 150 of FIG. 3.

The other ownship is associated with a set 360 of graphical features similar to the set 350 of graphical features associated with the ownship 202; however, the set 360 of graphical features associated with the other ownship illustrate no navigation hazards associated with the other ownship. Thus, the set 360 of graphical features does not include a time scale, an advice band, etc. However, the set 360 of graphical features does include rings 364 corresponding to a compass rose around the graphical feature 362 representing the other ownship and a heading indicator 366. The heading indicator 366 indicates that the other ownship is on a heading toward a waypoint 370. The display 150 of FIG. 6 also includes an ownship information box 368 associated with the other ownship.

The various examples of the display 150 in FIGS. 3-6 are configured to dynamically update to convey information regarding the time-criticality (and in-turn priority) of responding to various navigational hazards. The display 150 also provides guidance in a manner that helps the pilot to associate and prioritize relevant information with particular navigation hazards, e.g., to indicate which other aircraft in an airspace is the most urgent navigational hazard. Also, in the specific examples illustrated in FIGS. 3-6, only no-go advice is provided to the pilot. For example, advice bands are only used to indicate headings that the pilot should not take. By improving pilot situational awareness and decreasing pilot workload, the display 150 supports more effective and efficient pilot decision making for complex airspace scenarios, such as airspaces that have multiple other aircraft that are navigational hazards, encounters in proximity to terrain, inclement weather, etc.

Figure 7:
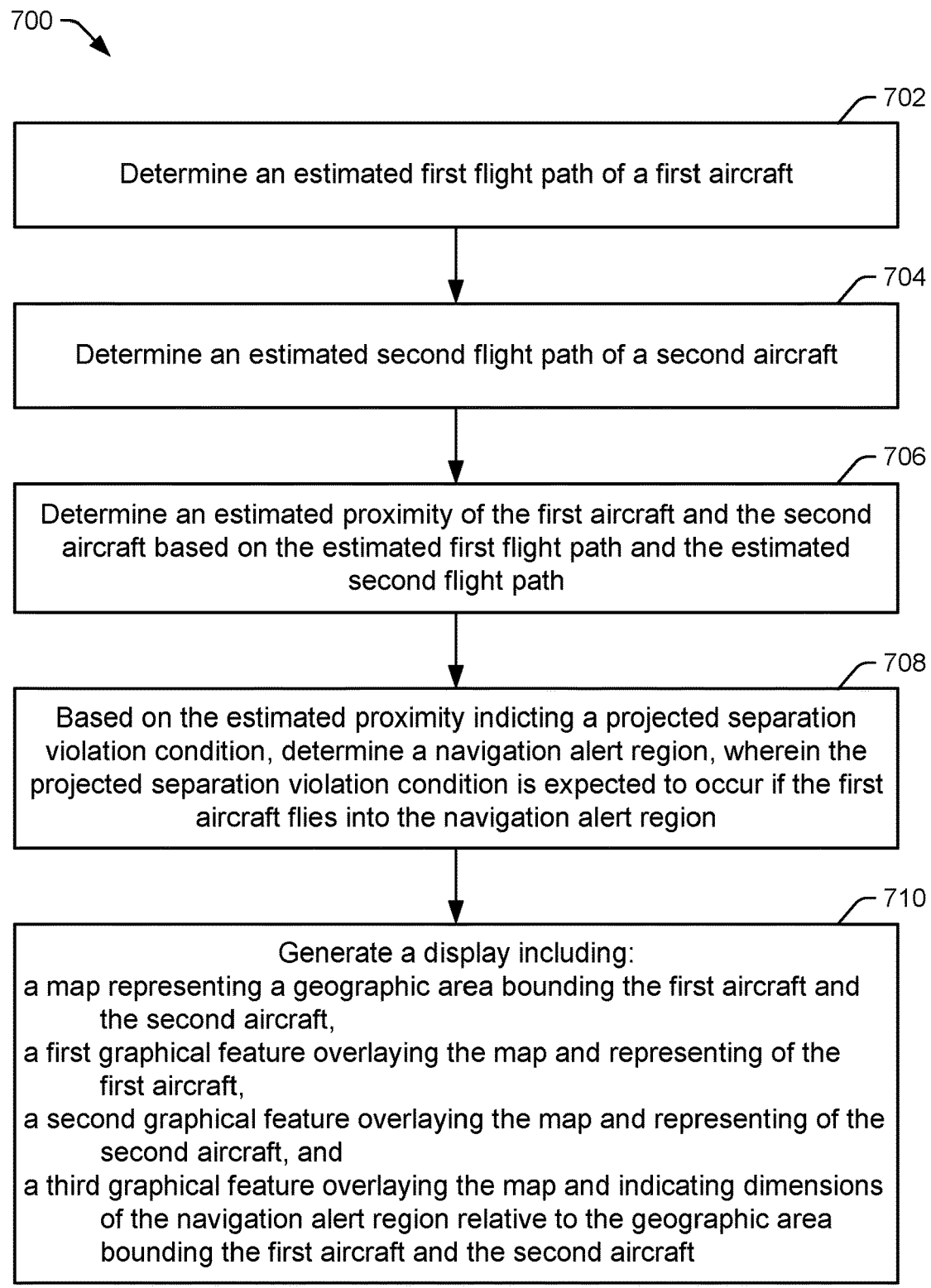
FIG. 7 is a flow chart that illustrates an example of a method of generating an aircraft information display.

FIG. 7 is a flow chart that illustrates an example of a method 700 of generating an aircraft information display, such as the display 150 of one or more of FIGS. 1 and 3-6. The method 700 can be performed by the aircraft flight information system 104 of FIG. 1. For example, the processor(s) 124 of the aircraft flight information system 104 can execute the instructions 132 to perform operations of the method 700.

The method 700 includes, at 702, determining an estimated first flight path of a first aircraft (e.g., the ownship 202 of FIG. 2), and at 704, determining an estimated second flight path of a second aircraft (e.g., the aircraft 210B of FIG. 2). The flight paths are determined, for example, by extrapolating the current heading and speed of each the first and second aircraft. As another example, the estimated first flight path of the first aircraft can be determined as a set of possible first flight paths, based on the current heading and speed of the first aircraft and based on flight dynamics or operational limits of the first aircraft. Additionally, or in the alternative, the estimated second flight path of the second aircraft can be determined as a set of possible second flight paths, based on the current heading and speed of the second aircraft and based on flight dynamics or operational limits of the second aircraft.

The method 700 also includes, at 706, determining an estimated proximity of the first aircraft and the second aircraft based on the estimated first flight path and the estimated second flight path. Various methods can be used to determine the estimated proximity. As a first example, each flight path can be treated as a line in space, and a geometric calculation can be used to solve for a minimum distance between the two lines. In this example, if the geometric calculation indicates that the two lines approach within a threshold distance (e.g., a minimum separation threshold) the calculation indicates that a separation violation condition is expected to occur. Subsequently, additional calculations can be used to determine a time or times along the flight path during which the two aircraft are expected to be within the separation threshold from one another.

The method 700 includes, at 708, based on the estimated proximity indicating a projected separation violation condition, determining a navigation alert region (e.g., the navigation alert region 216 of FIG. 2), where the projected separation violation condition is expected to occur if the first aircraft flies into the navigation alert region. In some implementations, the navigation alert region is determined by comparing the second flight path to multiple possible first flight paths. For example, the second flight path is determined by extrapolating along the current heading and speed of the second aircraft (e.g., the aircraft 210B). In this example, the plurality of possible first flight paths of the first aircraft (e.g., the ownship 202) can include each possible flight path of the first aircraft based on the current heading and speed of the first aircraft and based on the aircraft characteristics 144 of the first aircraft. In such implementations, a proximity between the second flight path of the second aircraft and each of the possible first flight paths can be determined, and the navigation alert region corresponds to an area including each possible first heading in which a separation violation condition occurs.

The method 700 includes, at 710, generating a display including a map representing a geographic area near the first aircraft and the second aircraft. For example, the display 150 includes the map 152 in FIGS. 1 and 3-6. In the method 700, the display also includes a first graphical feature overlaying the map and representing of the first aircraft and a second graphical feature overlaying the map and representing of the second aircraft. For example, the display 150 of FIGS. 3-6 includes the graphical feature 302 representing the ownship 202 and includes the graphical features 310 representing the aircraft 210. In the method 700, the display further includes a third graphical feature overlaying the map and indicating dimensions of the navigation alert region relative to the geographic area near the first aircraft and the second aircraft. For example, the display 150 of FIGS. 3-6 includes the color-coded geometric shape 316 which has a size, shape and position on the map 152 corresponding to boundaries of the navigation alert region 216 of FIG. 2.

Figure 8:
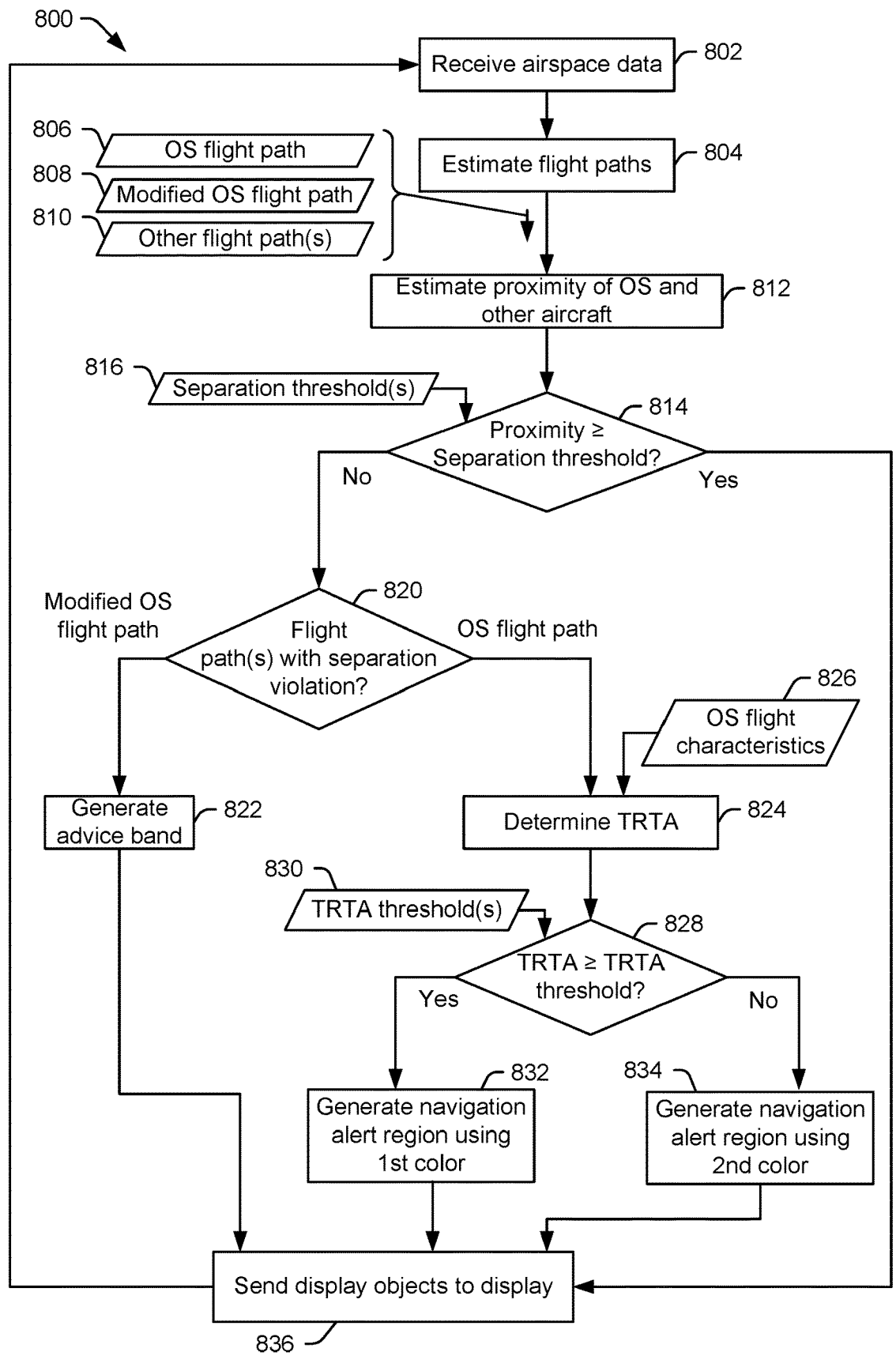
FIG. 8 is a flow chart that illustrates another example of a method of generating an aircraft information display.

FIG. 8 is a flow chart that illustrates another example of a method 800 of generating an aircraft information display, such as the display 150 of one or more of FIGS. 1 and 3-6. The method 800 can be performed by the aircraft flight information system 104 of FIG. 1. For example, the processor(s) 124 of the aircraft flight information system 104 can execute the instructions 132 to perform operations of the method 800.

The method 800 includes, at 802, receiving airspace data. For example, the communication interface 118 of the aircraft flight information system 104 of FIG. 1 can receive the airspace data 114. In this example, the airspace data 114 is descriptive of an airspace environment around an aircraft, e.g., an ownship. To illustrate, the airspace data 114 may be descriptive of the airspace 200 of FIG. 2, which includes the ownship 202.

The method 800 also includes, at 804, estimating flight paths. For example, the estimated flight paths can include, an ownship flight path 806, one or more modified ownship flight paths 808, and other flight paths 810 for other aircraft in the airspace. In a particular implementation, the ownship flight path 806 is determined by extrapolating a current heading and speed of the ownship. Likewise, the other flight paths 810 can be determined by extrapolating the current headings and current speeds of the other aircraft. The modified ownship flight paths 808 are determined based on the current heading and current speed of the ownship, and also based on aircraft characteristics (e.g., flight dynamics) of the ownship. To illustrate, the modified ownship flight paths 808 can include a range of flight paths that are possible for the ownship based on the ownship's current heading, speed, and characteristics. In some implementations, the modified ownship flight paths 808 can include all of the ownship flight paths that are possible taking into account the ownship's current heading, speed, and characteristics. For example, the modified ownship flight paths 808 can be determined as a distribution of possible ownship locations for each of a set of future time intervals. In other implementations, the modified ownship flight paths 808 include a subset of the possible ownship flight paths. For example, the modified ownship flight paths 808 can include a set of discrete flight paths, such as one flight path for each degree of possible (in view of the ownship's current heading, speed, and characteristics) angular change of the heading of the ownship at each future time interval. In other examples, other amounts of angular change of heading can be used to generate the modified ownship flight paths 808, such as 5 degrees of angular change per modified ownship flight path 808, or one half degree of angular change per modified ownship flight path 808. In some implementations, the modified ownship flight paths 808 account for speed changes as well as, or instead of, heading changes. Other changes can also, or in the alternative, be projected, based on the ownship's current heading, speed, and characteristics, to generate the modified ownship flight paths 808, such as altitude changes. The other flight paths 810 can be estimated in the same manner or a similar manner to the manner in which the ownship flight path 806 and/or the modified ownship flight paths 808 are determined. For example, the other flight paths 810 can be estimated by extrapolating the current heading and speed of the other aircraft, or the other flight paths 810 can be estimated as a set of possible flight paths based on the current heading and speed of the other aircraft as well as information regarding the intent or characteristics (e.g., aerodynamic limitations) of the other aircraft.

The method 800 also includes, at 812, estimating proximities of the ownship and each other aircraft in the airspace based on the ownship flight path 806, the modified ownship flight paths 808, and the other flight paths 810. The estimated proximities are compared to a separation threshold 816 or multiple separation thresholds, and a determination is made, at 814, whether each proximity satisfies a corresponding separation threshold. For example, a proximity can satisfy a particular separation threshold if the proximity is greater than or greater than or equal to the separation threshold.

If each proximity satisfies the corresponding separation threshold, the method 800 includes sending display objects to a display, at 836. In this circumstance, the display objects can include, for example, the map 152 and graphical features 154 representing the ownship and other aircraft in the airspace. The display objects can also include the set 360 of graphical features associated with the other ownship, as in FIG. 6, since no traffic warnings or traffic advice is needed.

If a proximity fails to satisfy the corresponding separation threshold, the method 800 includes determining the flight path or flight paths that have a separation violation, at 820. If a modified ownship flight path 808 has a separation violation, the method 800 includes, at 822, generating an advice band and sending display objects (including the advice band) to the display, at 836. The advice band indicates a range of headings of the modified ownship flight paths 808 that result in the projected separation violation condition between the ownship and another aircraft.

If the ownship flight path 806 has a separation violation, the method 800 includes determining a time remaining to act (TRTA), at 824. The TRTA is determined based on the ownship flight characteristics 826, e.g., flight dynamics, operational limitations, etc. For example, an aircraft that is more agile may have a longer TRTA in a particular circumstance than a less agile aircraft would have in the same circumstance.

The method 800 also includes, at 828, determining whether the TRTA satisfies a TRTA threshold 830. In a particular example, the TRTA satisfies the TRTA threshold 830 if the TRTA is greater than or is greater than or equal to the TRTA threshold 830.

If the TRTA satisfies the TRTA threshold 830, the method 800 includes, at 832, using a first color to generate a graphical feature representing a navigation alert region. If the TRTA fails to satisfy the TRTA threshold, the method 800 includes, at 834, using a second color (visually distinct from the first color) to generate the graphical feature representing a navigation alert region. In either case, the graphical feature representing the navigation alert region is a display object that is sent to the display, at 836, along with other display objects, such as the map 152 and the graphical features 154 representing other features of the airspace 200.

Although not shown in FIG. 8, the method 800 can also include generating other display objects based on the various decision steps of the method 800. For example, an advice band can be generated if the ownship flight path 806 includes the separation violation. As another example, a time scale can be generated to represent the TRTA. As yet another example, display objects other than or in addition to the graphical feature representing the navigation alert region can be color-coded to indicate or identify navigation hazards. To illustrate, the graphical feature 302 representing the ownship 202 can be color coded as in FIG. 3 in response to determining that the ownship flight path 806 is projected to include a separation violation. Further, the display objects can be sorted to indicate priority of various navigational hazards.

Figure 9:
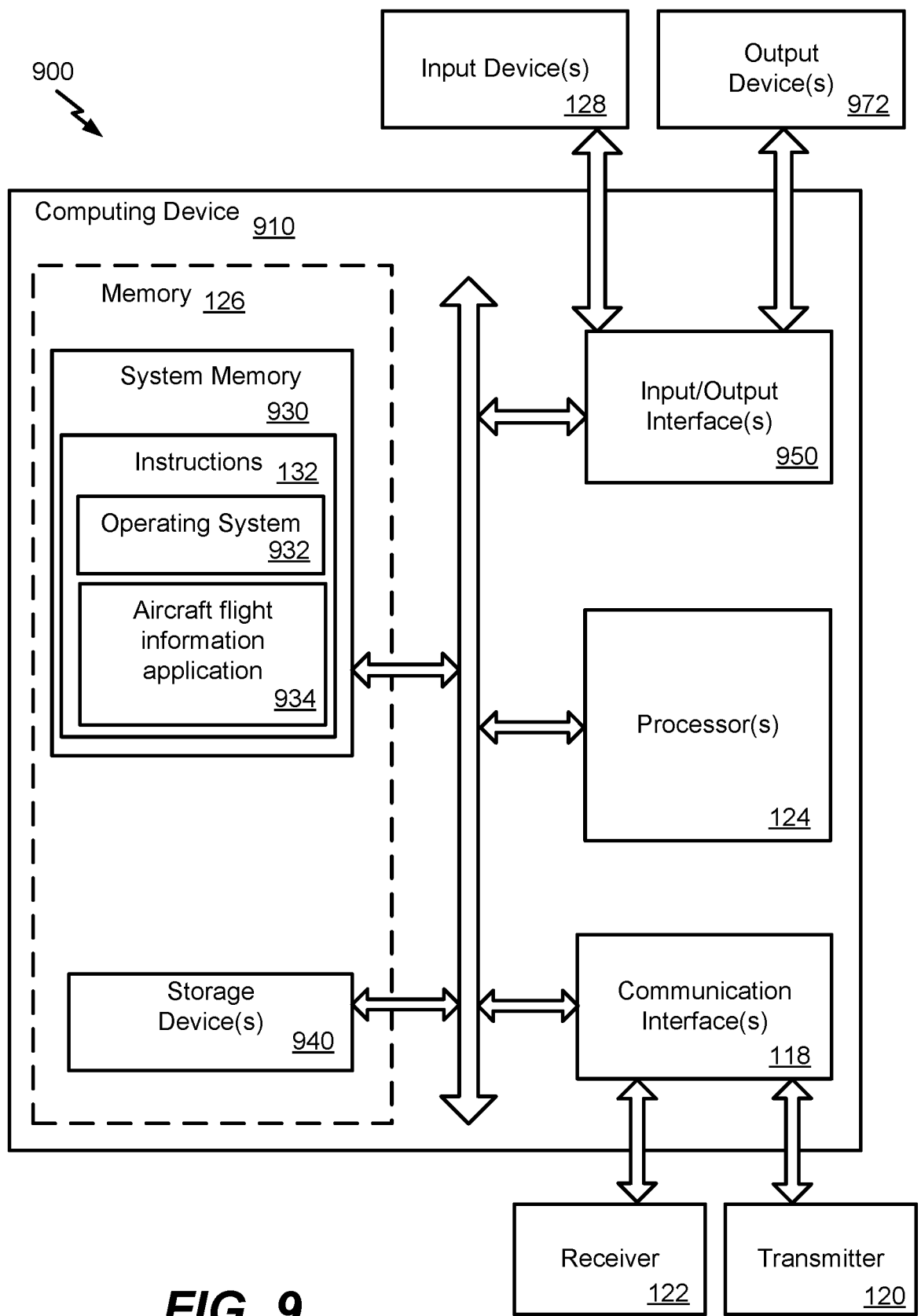
FIG. 9 is block diagram that illustrates an example of a computing environment including a computing device configured to perform operations of an aircraft flight information system.

FIG. 9 is block diagram that illustrates an example of a computing environment 900 including a computing device 910 that is configured to perform operations of an aircraft flight information system, such as the aircraft flight information system 104 of FIG. 1. The computing device 910, or portions thereof, may execute instructions to perform or initiate the functions of the aircraft flight information system 104. For example, the computing device 910, or portions thereof, may execute instructions according to any of the methods described herein, or to enable any of the methods described herein, such as the method 700 of FIG. 7 or the method 800 of FIG. 8.

The computing device 910 includes the processor(s) 124. The processor(s) 124 can communicate with the memory 126, which can include, for example, a system memory 930, one or more storage devices 940, or both. The processor(s) 124 can also communicate with one or more input/output interfaces 950 and the communication interface 118.

In a particular example, the memory 126, the system memory 930, and the storage devices 940 include tangible (e.g., non-transitory) computer-readable media. The storage devices 940 include nonvolatile storage devices, such as magnetic disks, optical disks, or flash memory devices. The storage devices 940 can include both removable and non-removable memory devices. The system memory 930 includes volatile memory devices (e.g., random access memory (RAM) devices), nonvolatile memory devices (e.g., read-only memory (ROM) devices, programmable read-only memory, and flash memory), or both.

In FIG. 9, the system memory 930 includes the instructions 132, which include an operating system 932 and an aircraft flight information application 934. The operating system 932 includes a basic input/output system for booting the computing device 910 as well as a full operating system to enable the computing device 910 to interact with users, other programs, and other devices. The aircraft flight information application 934 includes one or more of the flight control instructions 134, the flight path estimation instructions 136, the TRTA estimation instructions 138, or the GUI generation instructions 140 of FIG. 1.

The processor(s) 124 is coupled, e.g., via a bus, to the input/output interfaces 950, and the input/output interfaces 950 are coupled to the one or more input devices 128 and to one or more output devices 972. The output device(s) 972 can include, for example, the display device(s) 130 and the other output devices 156 of FIG. 1. The input/output interfaces 950 can include serial interfaces (e.g., universal serial bus (USB) interfaces or Institute of Electrical and Electronics Engineers (IEEE) 1394 interfaces), parallel interfaces, display adapters, audio adapters, and other interfaces.

The processor(s) 124 are also coupled, e.g., via the bus, to the communication interface 118. The communication interface 118 includes one or more wired interfaces (e.g., Ethernet interfaces), one or more wireless interfaces that comply with an IEEE 802.11 communication protocol, other wireless interfaces, optical interfaces, or other network interfaces. In the example illustrated in FIG. 9, the communication interface 118 is coupled to the receiver 122 and to the transmitter 120. However, in other implementations, such as the example illustrated in FIG. 1, the receiver 122 and the transmitter 120 are components of or integrated within the communication interface 118.

The illustrations of the examples described herein are intended to provide a general understanding of the structure of the various implementations. The illustrations are not intended to serve as a complete description of all of the elements and features of apparatus and systems that utilize the structures or methods described herein. Many other implementations may be apparent to those of skill in the art upon reviewing the disclosure. Other implementations may be utilized and derived from the disclosure, such that structural and logical substitutions and changes may be made without departing from the scope of the disclosure. For example, method operations may be performed in a different order than shown in the figures or one or more method operations may be omitted. Accordingly, the disclosure and the figures are to be regarded as illustrative rather than restrictive.

Moreover, although specific examples have been illustrated and described herein, it should be appreciated that any subsequent arrangement designed to achieve the same or similar results may be substituted for the specific implementations shown. This disclosure is intended to cover any and all subsequent adaptations or variations of various implementations. Combinations of the above implementations, and other implementations not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single implementation for the purpose of streamlining the disclosure. Examples described above illustrate but do not limit the disclosure. It should also be understood that numerous modifications and variations are possible in accordance with the principles of the present disclosure. As the following claims reflect, the claimed subject matter may be directed to less than all of the features of any of the disclosed examples. Accordingly, the scope of the disclosure is defined by the following claims and their equivalents.

The invention claimed is:

1. A method of generating an aircraft display, the method comprising:
   determining an estimated first flight path of a first aircraft;
   determining an estimated second flight path of a second aircraft;
   determining an estimated proximity of the first aircraft and the second aircraft based on the estimated first flight path and the estimated second flight path;
   based on the estimated proximity indicating a projected separation violation condition, determining a navigation alert region, wherein the projected separation violation condition is expected to occur if the first aircraft flies into the navigation alert region; and
   generating a display including:
      a map representing a geographic area near the first aircraft and the second aircraft,
      a first graphical feature overlaying the map and representing of the first aircraft,
      a second graphical feature overlaying the map and representing of the second aircraft,
      a third graphical feature overlaying the map and indicating dimensions of the navigation alert region relative to the geographic area near the first aircraft and the second aircraft,
      a first advice band, the first advice band indicating a range of headings associated with the navigation alert region, wherein the range of headings is bounded by a first heading and a second heading, and
      a first numerical value indicating a difference between the first heading and the estimated first flight path.

2. The method of claim 1, wherein the third graphical feature includes a color-coded geometric shape over a portion of the map, the color-coded geometric shape having a size, a shape, and a position corresponding to boundaries of the navigation alert region.

3. The method of claim 2, wherein the color-coded geometric shape has a first color when time remaining to act to avoid entering the navigation alert region has a first value, wherein the color-coded geometric shape has a second color when the time remaining to act to avoid entering the navigation alert region has a second value, and wherein the first color is different from the second color and the first value is different from the second value.

4. The method of claim 1, wherein the display further includes a time scale indicating an estimated time until the first aircraft enters the navigation alert region.

5. The method of claim 1, wherein the display further includes:
   rings representing a compass rose, the rings centered around the first graphical feature,
   a heading indicator indicating a heading of the first aircraft relative to the compass rose wherein the first advice band is between the rings.

6. The method of claim 1, wherein the display further includes a second numerical value indicating a difference between the second heading and the estimated first flight path.

7. The method of claim 5, further comprising:
   determining an estimated third flight path of a third aircraft;
   determining whether changing a heading of the first aircraft to fly along a modified first flight path would result in a second projected separation violation condition based on the modified first flight path and the estimated third flight path; and
   determining a second range of headings of the first aircraft that are expected to result in the second projected separation violation condition, wherein the display further includes a second advice band, the second advice band bounded by the second range of headings and the rings.

8. The method of claim 1, wherein the display further includes a fourth graphical feature representing a projected intersection location of the estimated first flight path and the estimated second flight path.

9. The method of claim 1, further comprising estimating a time remaining to act, based on the estimated first flight path, the estimated second flight path, a separation threshold associated with the projected separation violation condition, and flight characteristics of the first aircraft.

10. The method of claim 9, wherein the display further includes an indication of the time remaining to act.

11. The method of claim 9, wherein a display characteristic of the third graphical feature is determined based on the time remaining to act.

12. The method of claim 1, further comprising:
   receiving input identifying a waypoint for the first aircraft; and
   based on determining that the waypoint is within the navigation alert region, generating output advising a pilot of the first aircraft that the waypoint is within the navigation alert region.

13. The method of claim 1, wherein the first aircraft is remotely piloted and the display is presented at a display device of a remote pilot station.

14. The method of claim 13, wherein the remote pilot station is associated with a plurality of aircraft including the first aircraft, and wherein the display further includes a graphical feature representing at least one other aircraft that is remotely piloted from remote pilot station.

15. An aircraft flight information system comprising:
   at least one processor; and
   a memory storing instructions that are executable by the at least one processor to perform operations comprising:
      determining an estimated first flight path of a first aircraft;
      determining an estimated second flight path of a second aircraft;
      determining an estimated proximity of the first aircraft and the second aircraft based on the estimated first flight path and the estimated second flight path;
      based on the estimated proximity indicating a projected separation violation condition, determining a navigation alert region, wherein the projected separation violation condition is expected to occur if the first aircraft flies into the navigation alert region; and
      generating a display including:
         a map representing a geographic area near the first aircraft and the second aircraft, a first graphical feature overlaying the map and representing of the first aircraft, a second graphical feature overlaying the map and representing of the second aircraft, a third graphical feature overlaying the map and indicating dimensions of the navigation alert region relative to the geographic area near the first aircraft and the second aircraft, a first advice band, the first advice band indicating a range of headings associated with the navigation alert region, wherein the range of headings is bounded by a first heading and a second heading, and a first numerical value indicating a difference between the first heading and the estimated first flight path.

16. The aircraft flight information system of claim 15, further comprising:

an input device coupled to the at least one processor and configured to receive input from a pilot to direct the first aircraft; and a communication interface coupled to the at least one processor and configured to generate a command based on the input and to provide the command to a transmitter to send the command to the first aircraft via a wireless transmission.

17. The aircraft flight information system of claim 16, wherein the input comprises designating a waypoint for the first aircraft, and wherein the command is generated and sent to the first aircraft based on a determination that the waypoint is not located in the navigation alert region.

18. The aircraft flight information system of claim 15, wherein the operations further comprise:

determining an estimated third flight path of a third aircraft; and comparing multiple modified first flight paths to the estimated third flight path to determine whether any of the multiple modified first flight paths would result in a second projected separation violation condition between the first aircraft and the third aircraft, wherein the generating the display includes generating an advice band indicating a range of headings of the multiple modified first flight paths that result in the second projected separation violation condition.

19. A non-transitory computer readable storage device storing instructions that are executable by a processor to perform operations comprising:

determining an estimated first flight path of a first aircraft;

determining an estimated second flight path of a second aircraft;

determining an estimated proximity of the first aircraft and the second aircraft based on the estimated first flight path and the estimated second flight path;

based on the estimated proximity indicating a projected separation violation condition, determining a navigation alert region, wherein the projected separation violation condition is expected to occur if the first aircraft flies into the navigation alert region; and generating a display including:

a map representing a geographic area bounding the first aircraft and the second aircraft, a first graphical feature overlaying the map and representing of the first aircraft, a second graphical feature overlaying the map and representing of the second aircraft, a third graphical feature overlaying the map and indicating dimensions of the navigation alert region relative to the geographic area bounding the first aircraft and the second aircraft, a first advice band, the first advice band indicating a range of headings associated with the navigation alert region, wherein the range of headings is bounded by a first heading and a second heading, and a first numerical value indicating a difference between the first heading and the estimated first flight path.

20. The non-transitory computer readable storage device of claim 19, wherein the third graphical feature includes a color-coded geometric shape over a portion of the map, the color-coded geometric shape having a size, a shape, and a position corresponding to boundaries of the navigation alert region, and the color-coded geometric shape having a color selected based on a time remaining to act to avoid entering the navigation alert region.

* * * * *